United States Patent
Potier et al.

(10) Patent No.: US 12,228,197 B2
(45) Date of Patent: Feb. 18, 2025

(54) ELECTROMECHANICAL ACTUATOR

(71) Applicant: GOODRICH ACTUATION SYSTEMS SAS, Vernon (FR)

(72) Inventors: Karl Potier, Paris (FR); Corentin Boitard, Maisons-Laffitte (FR); Maxime Serrand, Paris (FR); Raphael Medina, Ecouen (FR)

(73) Assignee: GOODRICH ACTUATION SYSTEMS SAS, Vernon (FR)

( * ) Notice: Subject to any disclaimer, the term of this patent is extended or adjusted under 35 U.S.C. 154(b) by 162 days.

(21) Appl. No.: 17/993,203

(22) Filed: Nov. 23, 2022

(65) Prior Publication Data
US 2023/0160458 A1  May 25, 2023

(30) Foreign Application Priority Data

Nov. 25, 2021 (EP) .................................... 21306643

(51) Int. Cl.
*B64C 13/50* (2006.01)
*F16H 37/12* (2006.01)
(Continued)

(52) U.S. Cl.
CPC ........... *F16H 37/122* (2013.01); *B64C 13/50* (2013.01); *H02K 7/108* (2013.01); *H02K 7/116* (2013.01); *H02K 11/21* (2016.01)

(58) Field of Classification Search
CPC ..... H02K 7/07; F16H 35/10; F16H 2035/005; F16H 37/122; F16H 25/2454; B64C 13/32; B64C 13/50
See application file for complete search history.

(56) References Cited

U.S. PATENT DOCUMENTS 3,034,619 A  5/1962  Glasgow et al.
3,472,091 A  10/1969  Troeger
(Continued)

FOREIGN PATENT DOCUMENTS

CA  3028058  9/2019
CN  108216683 B  5/2021
(Continued)

OTHER PUBLICATIONS

Abstract for CN108216683 (B), Published: May 7, 2021, 1 page.
European Search Report for Application No. 21306643.4, mailed May 19, 2022, 11 pages.

*Primary Examiner* — Gregory Robert Weber
(74) *Attorney, Agent, or Firm* — CANTOR COLBURN LLP (57) ABSTRACT

An electromechanical actuator (EMA) includes a plurality of modes and includes an electrical motor having a motor shaft extending along an axis (A) and that drives the shaft to rotate about the axis and a gear assembly mounted around, and in geared connection with the shaft, to rotate with the shaft. The EMA output is connected to the gear assembly such that rotation of the motor shaft causes rotation of the output via the gear assembly, the output rotating at a speed which is a predetermined fraction of the speed of rotation of the motor shaft based on the gear ratio of the gear assembly. The EMA also includes a synchroniser comprising a first conical portion connected to an end of the motor shaft, and a second conical portion connected to a ratchet. The synchroniser has an engaged position and a disengaged position.

11 Claims, 6 Drawing Sheets

(51) Int. Cl.
*H02K 7/108* (2006.01)
*H02K 7/116* (2006.01)
*H02K 11/21* (2016.01)

(56) References Cited

U.S. PATENT DOCUMENTS

| | | |
|---|---|---|
| 9,483,057 B2 | 11/2016 | Dorr et al. |
| 9,493,230 B2 * | 11/2016 | Balsiger .................. F16H 37/04 |
| 9,829,055 B2 | 11/2017 | Defosse et al. |
| 10,000,275 B2 * | 6/2018 | Tendola ................ B64C 13/341 |
| 10,035,585 B2 | 7/2018 | Schwartz |
| 2004/0040813 A1 * | 3/2004 | Darby .................. F16D 63/006 |
| | | 192/46 |
| 2015/0184700 A1 | 7/2015 | Balsiger |

FOREIGN PATENT DOCUMENTS

| | | |
|---|---|---|
| EP | 1411272 A2 | 4/2004 |
| EP | 1411272 A3 | 4/2004 |
| EP | 2617978 A2 | 7/2013 |
| EP | 2947005 A1 | 11/2015 |
| EP | 2617978 A3 | 12/2016 |
| GB | 621886 A | 4/1949 |
| WO | 9723719 | 7/1997 |

* cited by examiner

ELECTROMECHANICAL ACTUATOR

CROSS-REFERENCE TO RELATED APPLICATIONS

This application claims priority to European Patent Application No. 21306643.4 filed Nov. 25, 2021, the entire contents of which is incorporated herein by reference.

TECHNICAL FIELD

The present disclosure relates to an electromechanical actuator, EMA, such as for positioning moveable surfaces such as spoilers, wing flaps, etc. in aircraft.

BACKGROUND

Actuators find many applications, particularly in controlling movement of a moveable component. In aircraft, many moveable components and surfaces are moved by means of an actuator.

Conventionally, many actuators, particularly in vehicles, aircraft, heavy machinery etc. are hydraulic actuators where components are moved in response to hydraulic or pressurized fluid. In general terms, a hydraulic actuator comprises a cylindrical housing in which is mounted an axially moveable piston rod. A head of the rod, inside the housing, divides the housing into two chambers each having a fluid port via which pressurised fluid can be injected into the chamber or low pressure fluid exits the chamber, so as to change the relative pressure in the two chambers either side of the piston head, thus causing movement of the piston relative to the housing. A free end of the piston rod that extends out of the housing is attached to a component or surface to be moved. Hydraulic fluid is provided to the actuator, from a hydraulic fluid supply in fluid communication with the interior of the actuator housing via the ports in the housing, to cause the piston rod to extend out of the housing, or hydraulic fluid is withdrawn from the housing to cause the piston rod to retract back into the housing. The movement of the piston rod is determined by the direction or and pressure of the fluid applied to the actuator, which is in response to a control signal. As the piston rod moves relative to the housing, the moveable component or surface to which it is attached will move accordingly. To allow both extension of the rod and retraction of the rod, a valve is provided to set the movement to extension or retraction. This may be a servovalve, more specifically an electrohydraulic servovalve (EHSV). The valve is positioned between the hydraulic fluid supply and the actuator and is moveable, in response to an electric control signal, between a first position in which high pressure fluid flows from the supply into one chamber of the actuator housing and low pressure fluid exits from the other chamber, and a second position in which high pressure fluid is injected into the other chamber and withdrawn from the first chamber of the actuator housing. The valve may also have a neutral or closed position in which fluid is neither supplied to nor withdrawn from the actuator housing.

Whilst hydraulic actuators have proven reliable and effective particularly in large load applications, the hydraulic parts of the system add considerably to the overall weight and size of the system. Also, hydraulic systems are subject to leakage and are not particularly clean.

There has, in recent years, been a move to replace hydraulic systems, in many fields, such as in aviation, with electrical or partly electrical systems which have reduced weight and footprint compared to hydraulic systems. With the move towards 'more electric aircraft' (MEE) or 'all electric aircraft' (AEE), for example, there has been a move towards using electromechanical actuators (EMA) to control the movement of movable surfaces and components.

In general, EMAs include an electric motor having an outlet shaft with first and second directions of rotation and a transmission assembly arranged to connect the shaft to the moveable surface.

One particular application for actuators (including EMAs) is in controlling movement of a spoiler on the wing of an aircraft. A spoiler is a moveable surface mounted on an aircraft wing behind the wing flap. When the aircraft is cruising, both the wing flap and the spoiler lay flat along the wing. To reduce aircraft speed, the spoiler is raised upwards relative to the wing.

The spoiler movement is caused by the actuator extending as described above in its so-called 'active mode'.

If electric power is lost when the spoiler is extended, excessive drag could be exerted by the spoiler. Systems are known, therefore, to retract the spoiler to its 'zero' position in the event of electric power loss thanks to aerodynamic loads. Usually, with hydraulic systems, this is by means of the EHSV being biased to a valve position where the high pressure fluid is provided to the chamber on the piston rod side of the piston head so that the pressure on that side of the head is greater than in the other chamber, causing the piston to retract into the housing.

Conventionally, a mechanical stop inside the housing stops the piston rod at the zero position.

Problems can also occur in spoiler control if there is a loss of hydraulic or motor power. Here a solution to prevent extension of the actuator, is an anti-extension function.

If the spoiler is extended, and pressure or power is lost, the spoiler will be retracted by aerodynamic load, and will gradually drop to become aligned with the wing surface until the zero hinge position is reached. The anti-extension function keeps the spoiler at this position to prevent a spurious extension.

Most aircraft have a spoiler that operates using a positive stroke of the actuator rod—i.e. for extension of the rod to lift the spoiler. The stroke of the actuator is between a 'zero' position in the housing and an extended position and the control system is biased to return the rod to the zero position.

More recently, some aircraft have incorporated a 'droop' function in the spoiler, using a negative stroke of the piston rod—i.e. further back into the housing than the zero position or, put another way, a stroke moving from the zero position in the opposite direction to the direction moved in the positive stroke for extending the rod.

The droop function is used to lower the spoiler relative to the wing e.g. for high lift manoeuvers or to close a large air gap between the wing flap and the spoiler if the wing flap is extended.

A problem occurs in the area of overlap of the spoiler and the wing flap ranges of motion. If, for example, electrical power driving the spoiler is lost, the spoiler will, under its own weight or under pressure from the actuator components, press against the wing flap, thus interfering with movement of the wing flap if retraction is demanded. Because of the anti-extension function which is activated on loss of power, the spoiler cannot be extended to allow pavement of the wing flap.

There is a need for a more compact EMA that includes at least an active mode, an anti-extension mode and a droop function (and preferably also a maintenance mode as discussed further below) which has a reduced envelope and reduced weight and cost, whilst still guaranteeing reliable operation and also avoiding the problem of the spoiler becoming stuck in the droop state on loss of power.

SUMMARY

The embodiments disclosed herein may allow the actuator to be returned to its zero or neutral position from negative stroke or droop, in the event of power failure.

Specifically, there is provided an electromechanical actuator, EMA, having a plurality of modes, comprising: an electrical motor having a motor shaft extending along an axis (A) of the EMA, the motor driving the shaft to rotate about the axis; a gear assembly mounted around, and in geared connection with the shaft, to rotate with the shaft; an EMA output connected to the gear assembly such that rotation of the motor shaft causes rotation of the output via the gear assembly, the output rotating at a speed which is a predetermined fraction of the speed of rotation of the motor shaft based on the gear ratio of the gear assembly; a synchroniser comprising a first conical portion connected to an end of the motor shaft, and a second conical portion connected to a ratchet, wherein the synchroniser has an engaged position in which rotation of the first conical portion is transmitted to the second conical portion, and a disengaged position wherein the second conical portion is axially spaced apart from the first conical portion, along the axis (A), such that rotation of the first conical portion is not transmitted to the second conical portion; a solenoid connected to the second conical portion, the solenoid configured to pull the second conical portion along the axis (A) away from the first conical portion when the solenoid is energised; wherein, in an active mode of the plurality of modes, the solenoid is energised and wherein rotation of the motor shaft in either direction of rotation drives the output to rotate; wherein in an anti-extension mode, the solenoid is not energised and the output shaft is connected for rotation, via the synchroniser, to the ratchet; and a cam feature arranged to rotate with the output, the cam feature having a cam profile such that when the output is in positive stroke and the solenoid is de-energised, the ratchet is engaged, wherein the ratchet is arranged to prevent rotation of the output in a predetermined direction of rotation; and when the output is in negative stroke, the ratchet is disengage so as to allow rotation of the output in either direction of rotation.

BRIEF DESCRIPTION OF THE DRAWINGS

Preferred embodiments will now be described by way of example only and with reference to the drawings.

DETAILED DESCRIPTION

The EMA of this disclosure will be described in relation to an actuator for an aircraft and, in particular, for controlling movement of a spoiler on an aircraft wing. It should be noted, however, that other applications can be envisaged for the EMA of this disclosure, that fall within the scope of the claims, and the description is by way of example only.

Figure 1:
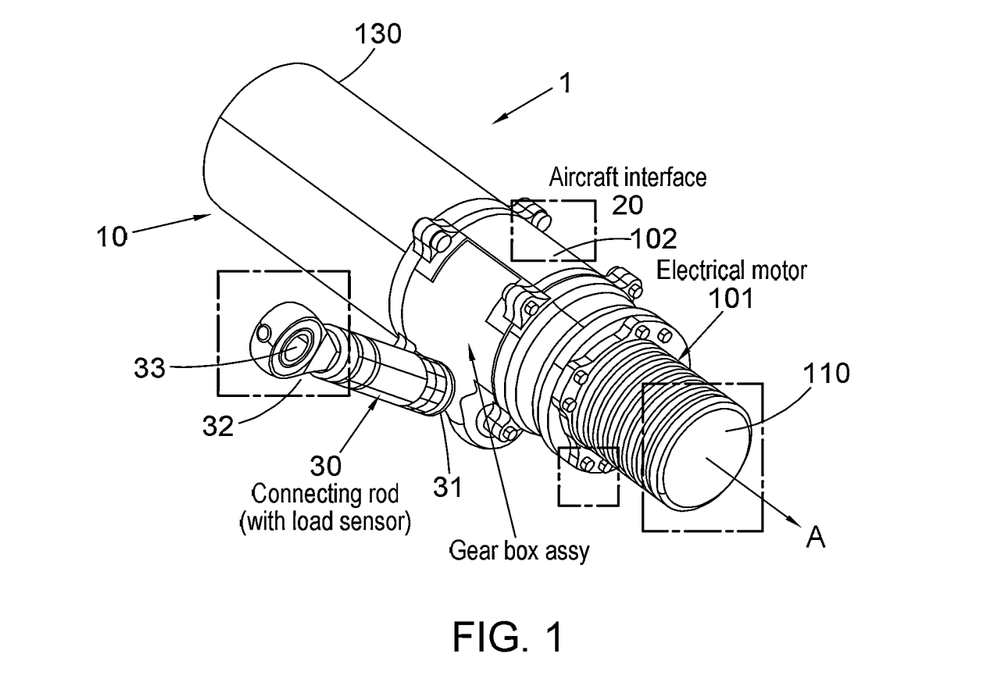
FIG. 1 is a 3D exterior view of an actuator according to this disclosure.

FIG. 1 shows a compact rotary EMA actuator 1 according to the disclosure. The EMA is mounted within an essentially cylindrical body 10 extending along an axis A. The EMA has an interface 20 to the aircraft/stationary main part of an aircraft wing (not shown). A connecting rod 30 extends from an external mobile crown XX. The connecting rod 30 has a first end 31 that is connected to the output of the actuator as will be described further below, to cause rotation of the connecting rod 30 according to the motor drive. The opposite, second end 32 of the rod is configured to be attached to the part or surface to be moved by the actuator e.g. the spoiler (not shown). The second end 32 of the connecting rod 30 may be provided with an eye 33 for attachment to a part of the movable surface. A load sensor (not shown) may be provided in or on the connecting rod 30. A first portion 101 of the EMA is configured to house an electrical motor as described further below and an end 110 forms an interface for electrical connection with an electrical control unit, ECU, (not shown). The ECU can be any suitable type.

An intermediate portion 102 of the EMA is configured to house the gear assembly and to provide the interface between the actuator output and the connecting rod 30. The other end portion 103 of the EMA is configured to house the actuator solenoid and the anti-extension, maintenance mode system parts described further below.

Figure 2:
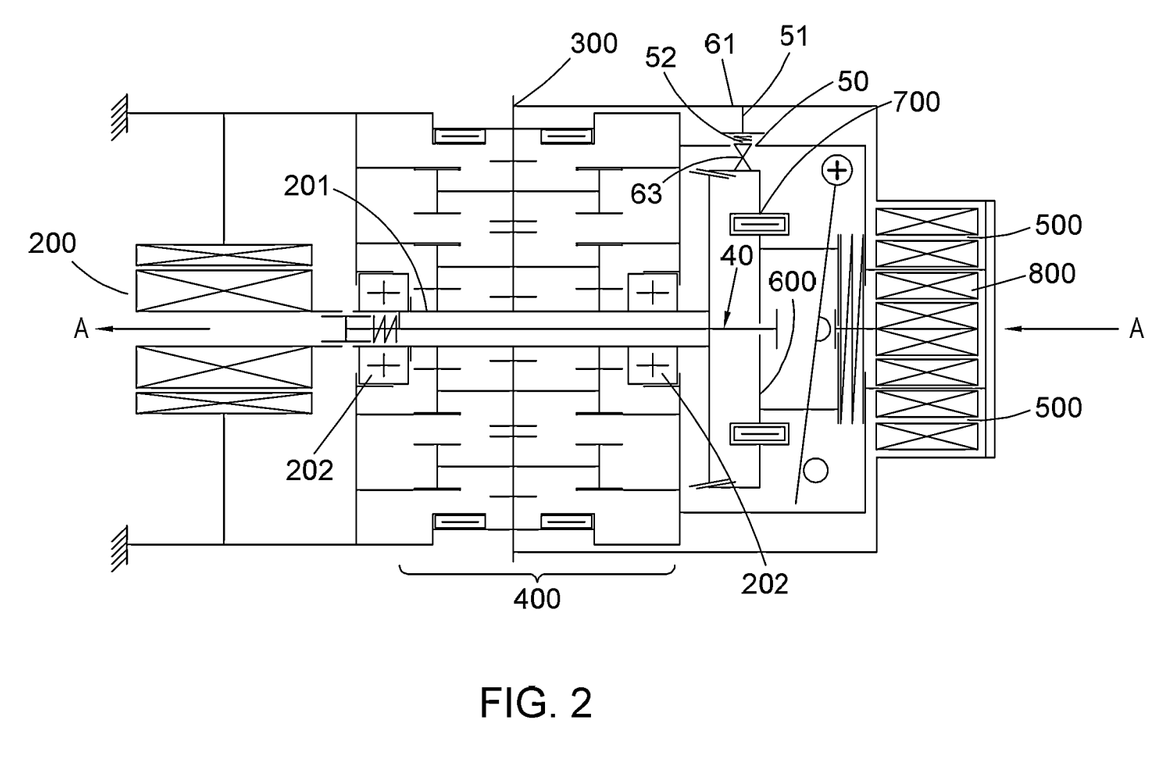
FIG. 2 is a schematic view of the mechanism of an actuator according to the present disclosure.

The fact that the functional components of the EMA, as described further below, can all be arranged around the axis A means that the EMA unit as a whole is relative compact and light compared to hydraulic systems or other more distributed actuators at Aircraft level Referring now to FIG. 2, the functional parts of the EMA will now be described in more detail.

The EMA includes an electrical motor 200 with an output shaft 201 that extends along the EMA axis A and which drives a rotary output 300 via a gear assembly 400 (described further below). The motor is controlled by means of a command from the ECU. The motor shaft 201 is supported by and extends through bearings 202 and terminates in a conical end portion 203 which forms part of a synchronizer, including a clutch and ratchet, described further below. The motor shaft 201 also has a decoupling portion 204 which is a break in the shaft that is bridged by an end section 41 of a maintenance mode lever 40 (described further below). In normal operation, the motor shaft between the motor and the conical end portion 203 is effectively a complete shaft as the break is bridged by the end section of the maintenance mode lever 40. The gear assembly 400 is configured with a gear ratio to cause the rotary output 300 to rotate at speed which is a predefined fraction of the rotational speed of the motor shaft 201. The rotary output 300 is arranged to be connected to the connecting rod 30 to move the surface/part according to the command. This is the normal, active mode of operation.

An output position sensor (OPS) 500 may also be provided to provide an indication of the rod position to the ECU.

The EMA also includes components necessary to operate the EMA in the anti-extension mode and the maintenance and to provide the droop function. These modes and functions, and the component parts, will be described further below.

Briefly, however, a clutch 600 and ratchet wheel 700 mechanism, together with a solenoid 800 cooperate in the anti-extension mode. A maintenance mode lever 40 and cam arrangement 50 cooperate in the maintenance mode, and the clutch 600 and the cam arrangement 50 cooperate for the droop function.

The gear system 400 includes a first gear stage 401 mounted around the motor shaft 201. Rotation of the motor shaft rotates the first gear stage. A second gear stage 402 is mounted around the first gear stage and is in toothed or meshing engagement therewith such that rotation of the first gear stage causes rotation of the second gear stage but at a lower rotational speed according to the gear ratio. The second gear stage 402 is engaged with the rotary output 300 to cause corresponding rotation thereof which, in turn, causes rotation of the connecting rod 30. The gear system therefore has compound gear kinematics.

Figure 3:
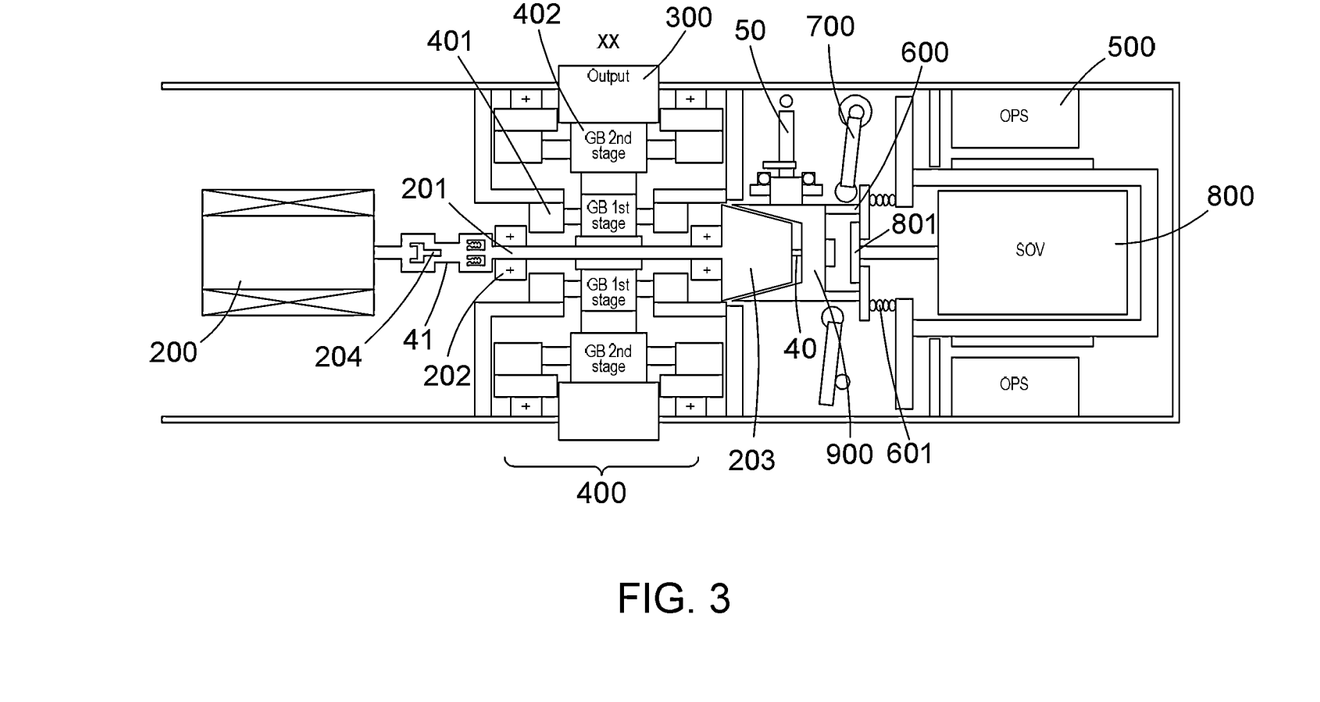
FIG. 3 is a schematic view of an actuator according to the present disclosure in an active mode.

FIG. 3 shows the configuration of the EMA when operating in the active mode.

In this mode, the solenoid, 800 is energised (power is provided) and so the synchronizer 900 components are held out of engagement with the conical end 203 of the motor shaft 201. In more detail, when the solenoid is in this energised state, the solenoid head 801 engages behind the clutch 600 of the synchronizer 900 pulling the clutch away from the conical end 203 and compressing clutch spring 601. The motor shaft, therefore, rotates freely on rotation of the motor, causing rotation of the gear assembly 400 and, thus, the rotary output 300.

Figure 4:
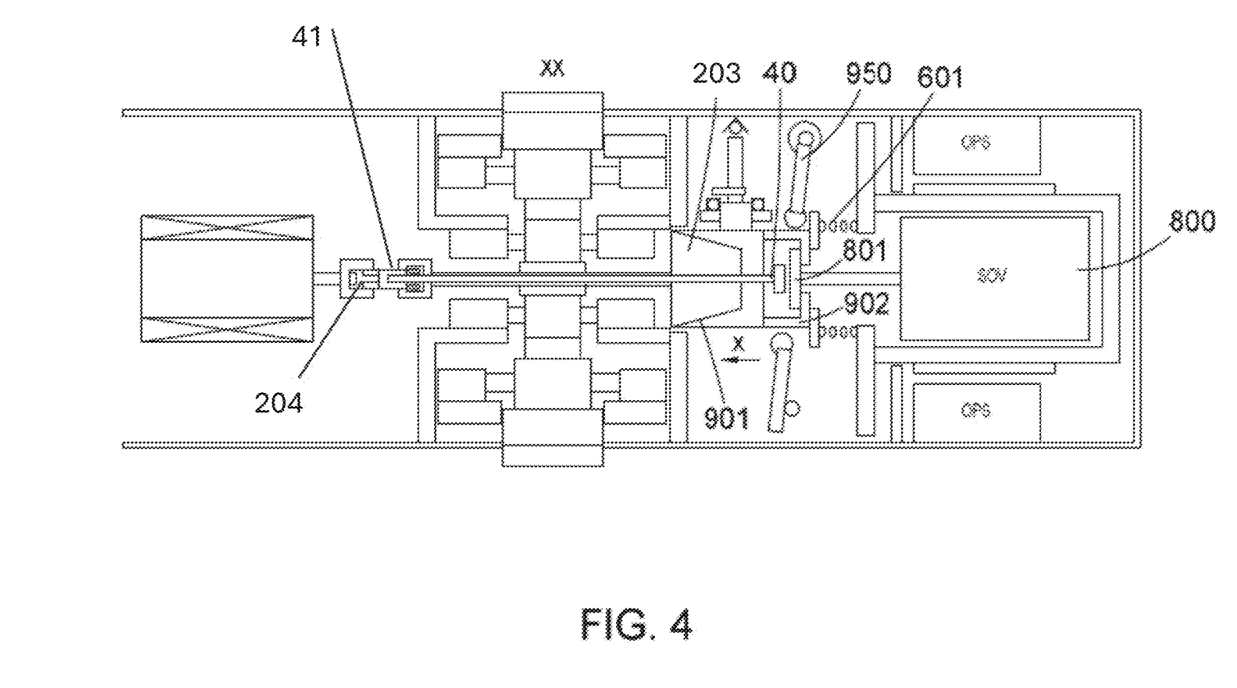
FIG. 4 is a schematic view of an actuator according to the present disclosure in an anti-extension mode in positive stroke.

The EMA of the disclosure is further designed to operate in an anti-extension mode, shown in FIG. 4) to prevent the actuator extending in the positive direction from the zero or neutral position in the event of power failure. The features of FIG. 4 that are the same as in FIG. 3 will not be described again here. As mentioned above, for safety and efficiency reasons, if power fails, the actuator should be configured to return e.g. the spoiler to its neutral or flat position and should prevent inadvertent or uncommanded lifting of the spoiler to the extended position due to e.g. aerodynamic forces. The power failure results in the SOV 800 being de-energised and so the head 801 no longer acts against the force of the spring 601 and the spring 601 relaxes to its extended state. This moves the clutch and the synchronizer 900 to the left in the drawings (arrow X). The synchronizer 900 is formed with a receptacle 901 having a shape that matches the shape of the conical end 203 of the motor shaft 201 such that movement of the synchronizer to the left (in the drawings) due to relaxation of the spring 601 causes the receptacle to engage with the conical end 203 of the motor shaft. When the two conical parts are engaged, rotation of the motor shaft 201 is transmitted through the engaged conical end and receptacle causing the synchronizer 900 to rotate. The other end of the synchronizer 902 forms a ratchet that engages with a pawl 950 that ensures that the ratchet can only rotate in one direction of rotation. Thus, in this mode, the motor shaft can rotate, and drive the output, in a first direction of rotation under drive of the motor 200, but is prevented from rotation in the opposite direction of rotation by the ratchet. The ratchet is configured such that the prohibited direction of rotation corresponds to the actuator extension direction, and so in this mode, extension is prevented.

The above, with reference to FIG. 4, describes the anti-extension function for positive strokes. As mentioned above, though, actuator systems have recently been developed that enable the actuator to operate with a negative stroke i.e. to actively retract further from the zero or neutral position. This so-called droop function allows, for example, an actuator controlled spoiler to move down relative to a wing body to follow downward movement of a wing flap. Under normal active operation, the spoiler is also able to return from the droop position by an extension operation of the EMA—i.e. a positive stroke.

A problem arises though if the EMA Is operating in the anti-extension mode where it is prevented from moving in the extension direction when power is lost. As can be seen in relation to FIG. 4, described above, if the solenoid is deactivated, the EMA moving the spoiler is prevented from operating in the extension direction. If, for example, the spoiler is in the droop zone to follow movement of a wing flap, and then power is lost, the wing flap will want to return to its neutral, non-extended position, but the spoiler, resting on the wing flap and so exerting a force on the flap against its movement to the neutral position, will prevent the flap from returning to neutral and the spoiler is not able to extend (i.e. move away from the flap) because of the anti-extension operation of the EMA.

The arrangement of the present disclosure provides a solution to this problem by use of a cam feature described further below with reference to FIGS. 5 and 7.

Figure 5:
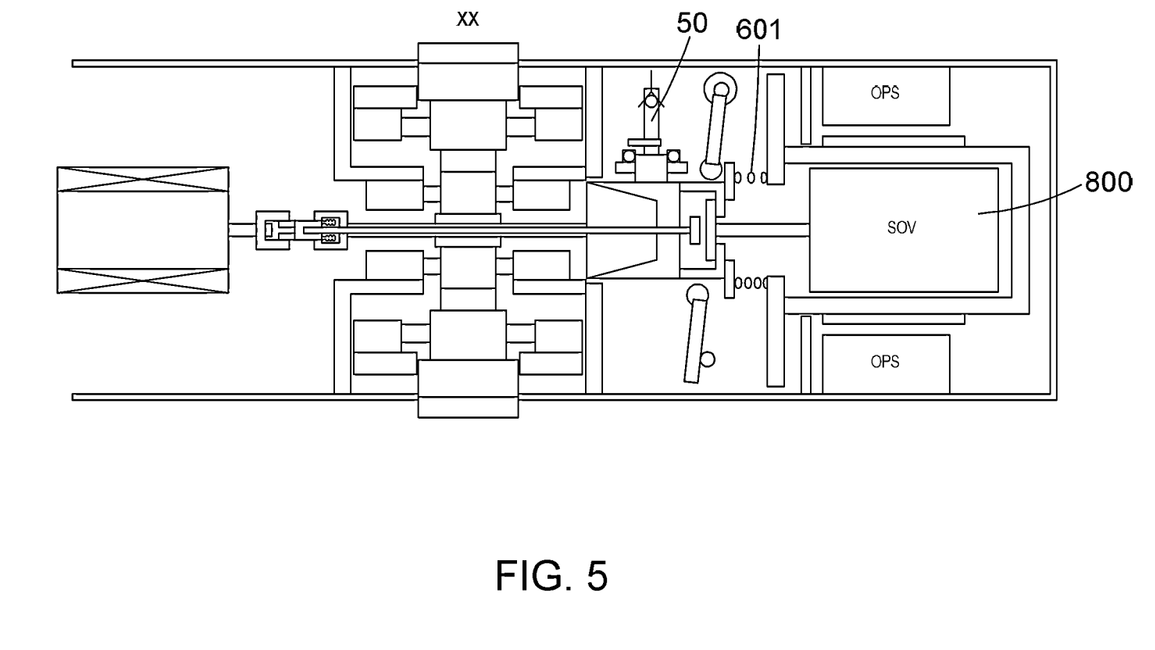
FIG. 5 is a schematic view of an actuator according to the present disclosure in an anti-extension mode in negative stroke (droop).

FIG. 5 shows the operation of the EMA when the system is in anti-extension mode—i.e. power has failed and so the SOV is not energised, the spring 601 is expanded and the clutch ratchet and pawl mechanism is engaged to prevent rotation in the extension direction. The EMA is, however, provided with a cam feature 50 which, as described further below, is provided with a cam profile that is designed to allow the EMA to operate in the extension direction even when the SOV is de-energised when the rotational position of the output 300 indicates that the EMA is in negative stroke—i.e. in a droop state, whereby the cam profile rotates with the rotary output 300.

Figure 7:
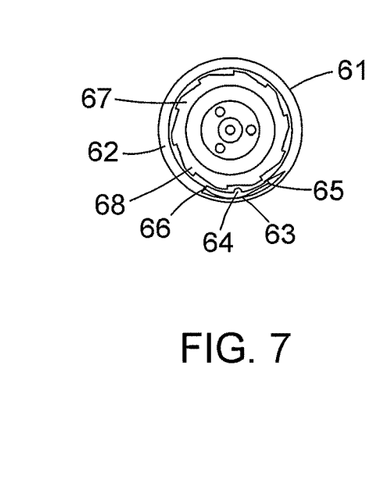
FIG. 7 shows the cam profile for explaining the operation in anti-extension mode.

The cam feature 50 is shown in detail in FIG. 7. The cam feature 50 is an annular structure mounted about the EMA axis A and a ratchet wheel connected to the synchronizer 900, and comprises an outer cam profile 61 that is connected to and rotates with the connecting rod 30 or with the EMA output 300. The outer cam profile 61 is not circular but, rather, has a smaller diameter region defining a droop zone and a larger diameter region defining a positive stroke zone. The cam system further includes a pawl 63 that is pivotal about a pivot point 64 and has a ratchet engaging end 66. A contact structure 65 is provided at the other end of the pawl 63, at or near the pivot point 64. The cam system further includes the ratchet wheel 67 of the synchronizer radially inwards of the outer cam profile.

The contact structure 65 comprises a piston 51 and a spring 52 which force the pawl to tilt into engagement with the ratchet wheel.

As the connecting rod 30 (or output 300) rotates, it causes a corresponding rotation of the outer cam profile 61. So long as the output 300 corresponds to a neutral position or positive stroke (i.e. in a non-droop zone), the larger diameter part of the cam profile passes the back of the pawl 63. The pawl at that moment is engaged, due to the force of the spring 52 and the piston 51, into the ratchet wheel. The pawl is positioned and located such that during time of rotation while the larger diameter part of the cam profile is passing the pawl, the cam profile rides across the contact structure 65 of the pawl and so the ratchet engaging end 66 of the pawl pivots radially inwards about the pivot point bringing the ratchet engaging end into engagement with the teeth 68 of the ratchet wheel 67. When the output 30 corresponds to the droop state, however, the smaller diameter part of the cam profile passes the pawl 63 causing the cam to press on the back of the pawl, compressing the spring 52 and thus causing the pawl to lift and avoid ratchet engagement with the teeth of the ratchet wheel. Thus, the motor shaft 201 is disconnected from the synchronizer 900 even though the SOV is de-energized, when in droop state and the output is free to turn in the direction allowing extension of the spoiler.

Therefore, due to the operation of the cam system, the anti-extension features are either engaged (which in the non-droop or positive stroke state) or disengaged, when in droop, based on the rotational position of the output/connecting rod.

In the droop zone, the pawl is lifted up so that the ratchet wheel can rotate in both directions.

Figure 6:
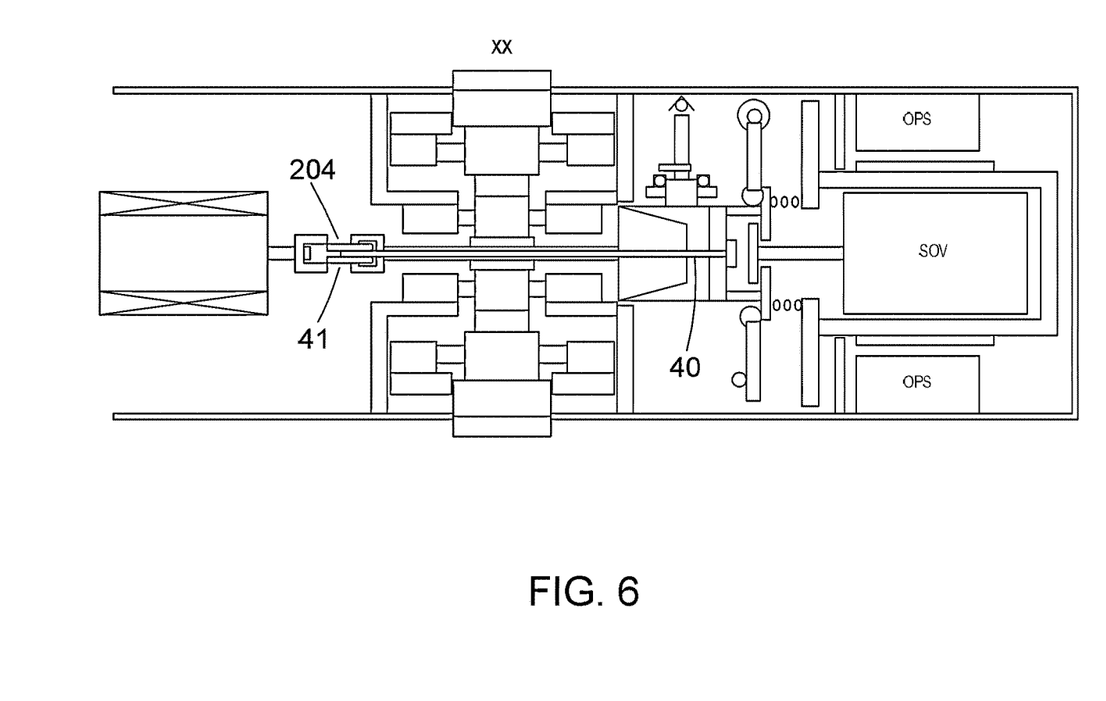
FIG. 6 is a schematic view of an actuator according to the present disclosure in a maintenance mode.

Operation of the EMA in maintenance mode will be described with reference to FIG. 6. In maintenance mode, the motor should be disengaged so that it does not drive the output 30 and the system ratchets should be disengaged to enable maintenance personal to manually turn the output without any resistance. By disengaging the motor, there is no risk of the output moving while being held by a maintenance worker even if the motor is accidentally activated. The EMA is set to maintenance mode by moving the end 41 of the motor maintenance lever 40 out of engagement with the motor shaft across the decoupling portion 204 using a tool such as a screw driver. In one example, the end 41 of the lever 40 is secured in place by means of a pivotal bracket that is, in normal operation, locked in a first, securing position, by a locking pin. The locking pin has a slotted end engaged to receive a screw driver or similar tool to rotate the pin. The circumference of the pin body is formed with one or more discrete flat portions, and other rounded portions which are, in normal operation, in engagement with the bracket. If the pin is rotated so that a flat portion is aligned with the bracket, the bracket is released and pivots out of the secured position thus releasing the end 41 of the lever from bridging the decoupling portion of the motor shaft and this disengaging the motor from the rest of the EMA.

The EMA of this disclosure is therefore a compact cylindrical housed unit containing functional components to operate the EMA in the various modes as well as to house the motor and solenoid of the SOV. Furthermore, the EMA is configured to allow extension when the EMA is in droop state even if power has failed.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an example embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

The invention claimed is:

1. An electromechanical actuator (EMA) having a plurality of modes, comprising:
   an electrical motor having a motor shaft extending along an axis of the EMA, the motor driving the shaft to rotate about the axis;
   a gear assembly mounted around, and in geared connection with the motor shaft, to rotate with the motor shaft;
   an EMA output connected to the gear assembly such that rotation of the motor shaft causes rotation of the EMA output via the gear assembly, the EMA output rotating at a speed which is a predetermined fraction of the speed of rotation of the motor shaft based on a gear ratio of the gear assembly;
   a synchroniser comprising a first conical portion connected to an end of the motor shaft, and a second conical portion connected to a ratchet, wherein the synchroniser has an engaged position in which rotation of the first conical portion is transmitted to the second conical portion, and a disengaged position wherein the second conical portion is axially spaced apart from the first conical portion, along the axis, such that rotation of the first conical portion is not transmitted to the second conical portion;
   a solenoid connected to the second conical portion, the solenoid configured to pull the second conical portion along the axis away from the first conical portion when the solenoid is energised;
   wherein, in an active mode of the plurality of modes, the solenoid is energised and wherein rotation of the motor shaft in either direction of rotation drives the EMA output to rotate;
   wherein in an anti-extension mode of the plurality of modes, the solenoid is not energised and the EMA output shaft is connected for rotation, via the synchroniser, to the ratchet; and
   a cam feature arranged to rotate with the EMA output, the cam feature having a cam profile such that when the EMA output is in a positive stroke and the solenoid is de-energised, the ratchet is engaged, wherein the ratchet is arranged to prevent rotation of the EMA output in a predetermined direction of rotation; and when the EMA output is in a negative stroke, the ratchet is disengage so as to allow rotation of the EMA output in either direction of rotation.

2. An EMA as claimed in claim 1, further comprising a connecting rod connected to the EMA output and configured to connect the EMA and a surface or part to be controlled by the EMA.

3. An EMA as claimed in claim 2, wherein the connecting rod is provided with an eye for connection to the surface or part to be controlled.

4. An EMA as claimed in claim 1, wherein the gear assembly comprises a first gear stage in geared connection with the motor shaft and a second gear stage in geared connection with the first gear stage and with the EMA output.

5. An EMA as claimed in claim 1, further comprising a position sensor to determine a position of rotation of the EMA output.

6. An EMA as claimed in claim 1, wherein the synchroniser comprises the ratchet and a clutch.

7. An EMA as claimed in claim 1, further comprising:
   a maintenance mode lever extending through the motor shaft, the motor shaft having a decoupling portion in the form of a gap along the motor shaft that is bridge by the maintenance mode lever, in a first mode and whereby the maintenance mode lever is moved from the decoupling portion, to disconnect the motor from the gear assembly in a maintenance mode of the plurality of modes.

8. An EMA as claimed in claim 1, wherein the synchroniser includes a spring that biases the synchroniser out of engagement with the motor in the active mode and engages the synchroniser and the motor shaft in the anti-extension mode when the solenoid is de-energised.

9. An EMA as claimed in claim 1, wherein the cam feature comprises a pawl and a contact structure, wherein in a positive stroke when the solenoid is de-energised, the pawl engages with the ratchet wheel and in a negative stroke when the solenoid is de-energised, the contact surface is pressed by the cam profile to remove the pawl from engagement with the ratchet wheel.

10. An EMA as claimed in claim 9, wherein the contact structure comprises a piston and a spring.

11. An EMA as claimed in claim 1, to drive a spoiler of an aircraft between an extended position, a neutral position and a droop position.

\* \* \* \* \*